United States Patent [19]
Aoki

[11] 3,712,786
[45] Jan. 23, 1973

[54] DEVICE FOR EJECTING IN INJECTION MOLDING OF THREADED ARTICLES

[76] Inventor: Katashi Aoki, 6037, Oaza Minamijo, Sakaki-machi, Hanishina-gun, Nagano-ken, Japan

[22] Filed: Feb. 3, 1971

[21] Appl. No.: 112,225

[30] Foreign Application Priority Data

Feb. 4, 1970 Japan....................................45/9439

[52] U.S. Cl. ...................425/438, 425/165, 264/318
[51] Int. Cl. ................................................B29f 1/14
[58] Field of Search ..18/2 RM, 2 RS, 30 R; 425/161, 425/165, 438

[56] References Cited

UNITED STATES PATENTS

| 3,388,431 | 6/1968 | Aoki | 18/2 RS X |
| 2,558,027 | 6/1951 | Wilson | 18/2 RS X |
| 2,984,862 | 5/1961 | Chabotte | 18/2 RS |
| 2,718,032 | 9/1955 | Harvey | 18/2 RS |

Primary Examiner—J. Spencer Overholser
Assistant Examiner—David S. Safran
Attorney—David H. Semmes

[57] ABSTRACT

A method for ejecting in injection molding of threaded articles wherein a movable mold clamping plate is provided with a shaft adapted to rotate threaded cores and a plurality of rods movably supporting a stripper plate arranged around said cores, thus permitting to release threaded molded articles from the cores by rotation thereof and forward movement of said stripper plate after mold opening, said forward movement being realized under pressure of the oil forced into the rods simultaneously with revolution of the rotating shaft, said stripper plate being moved at a velocity corresponding to the lead of screw thread of the cores by a combined action of a cam adapted to be actuated synchronously with the cores by revolution of said rotating shaft to me in one direction, said cam being set at a desired angle, and a stylus provided in contact with said model cam at the rear of said rods.

5 Claims, 5 Drawing Figures

DEVICE FOR EJECTING IN INJECTION MOLDING OF THREADED ARTICLES

The present invention relates to methods and devices for ejecting molded articles (mold releasing) to be used in injection molding of articles having screw threaded portions such as screw caps of bottles, joints and the like.

An injection molding machine designed to produce threaded articles includes a thread ejecting device associated with the mold closing mechanism thereof. This ejecting device is operated during the mold opening step. Turning force of the motor reduced by a worm gear is transmitted to a thread attachment and further to a gear box to rotate a core. In this case, the molded articles cannot be smoothly ejected from the mold by the revolution of the core only. In view of this fact, said thread attachment is connected to a stripper plate so that the stripper plate is moved at a velocity corresponding to the lead of screw thread of the core to achieve complete release of the molded article from the core. Accordingly, the core and the thread attachment have such relationship that incorrect selection of the latter at the time of mounting the former not only makes it impossible to eject the molded article but also leads to the damage thereof. Moreover, such arrangement is disadvantageous in that in order to move the stripper plate by the thread attachment it is necessary to operate the thread attachment before mold closing so as to move the stripper plate back to the gear box.

It is an object of this invention to provide a method to be used in injection molding of threaded articles for ejecting products made of synthetic resins having threaded portions smoothly and securely without employing any thread attachment.

It is another object of this invention to provide a method to be used in injection molding for ejecting the molded articles of synthetic resins having threaded portions wherein mold closing can be realized by leaving a stripper plate thrust out for ejecting molded articles in that state without moving it back to its position.

It is still another object of this invention to provide a device to be used in injection molding of threaded articles for ejecting wherein a stripper plate can be moved at a velocity corresponding to the lead of screw thread of a core by adjusting to the pitch of screw thread the angle of a cam arranged in a position related to a rotating shaft without replacing other parts regardless of the difference which takes place with the replacement of molds in the pitch of screw thread made on the circumference of the core and also in the degree of removal of the molded article from the mold per one revolution of the core.

In order to afford a clearer understanding of the present invention reference will now be made to the accompanying drawings illustrating by way of example a typical embodiment of the invention. In the drawings.

Figure 1:
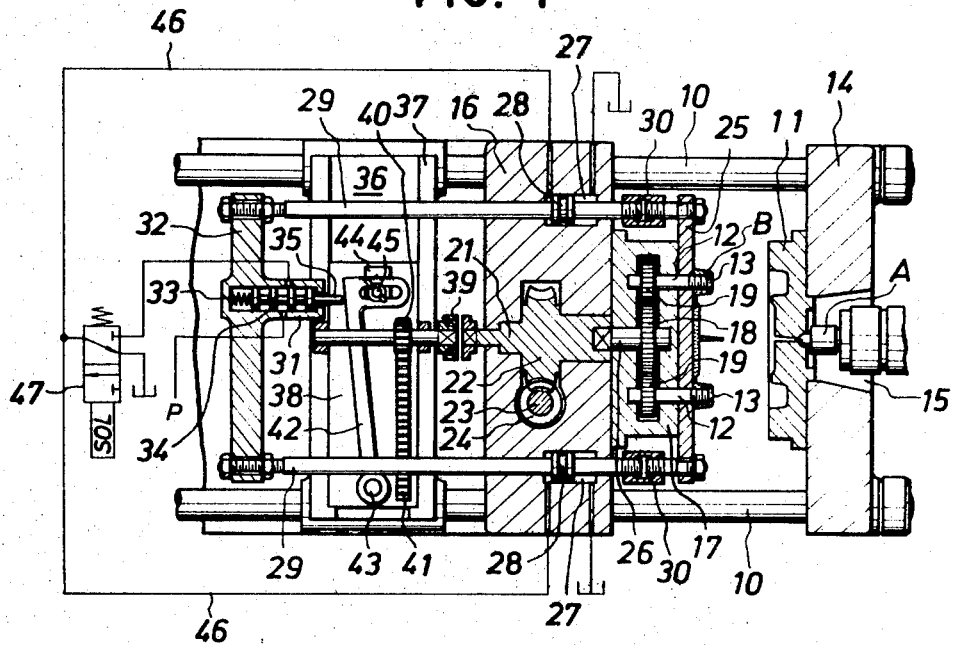
FIG. 1 shows a plan in cross-section of the device of this invention at the time of mold opening.

Referring now to the drawings, the reference numeral 11 designates a fixed mold and 12 indicates cores suitable to enter into the fixed mold 11 and having male threads 13 cut on outside surfaces in the end portions thereof. The fixed mold 11 is secured by bolts or the like to a fixed mold support plate 14 in a through hole 15 of which an injection nozzle A is located.

The above cores project from a gear box 17 detachably mounted in front of a movable mold clamping plate 16 which is supported by tie-bars 10. In this gear box is provided with an interlocking gear group consisting of a gear 18 and a number of pinions 19 equal to the number of cores 12 arranged around the gear 18. The main shaft 26 of the gear 18 is so connected to a rotating shaft 21 made integral with a worm gear 22 that the rotating shaft 21 and the gear 18 rotate in a fixed direction with the rotation of a worm gear 24 of driving shaft 23 connected to a motor. Their rotating force is transmitted to each pinion 19 and the core 12 having the same axis therewith, respectively.

In front of the gear box 17 is arranged a stripper plate 25 having through holes through which cores 12 pass. To both ends of this stripper plate 25 are connected through joints 30 the rods 29 each made integral with a head 28 which operates in a hydraulic cylinder 27 provided in the moving mold clamping plate 16. The back ends of rods 29 are integrally connected to each other by a connecting member 32 having a hydraulic servo-valve 31 inwardly projecting therin. In this hydraulic servo-valve 32 is provided a valve 34 adapted to act resiliently by a spring 33 and the end exposed outside of which constitutes a stylus 35. By the numeral 36 is designated a means for controlling the movement of the stripper plate which is connected integrally to the moving mold clamping plate 16 and located between the moving mold clamping plate 16 and the hydraulic servo-valve 31. This movement control means 36 consists of a combination of a fixed frame 37 and a movable plate 38. On the fixed frame 37 is provided a pinion 40 connected through an electromagnetic clutch 39 to the rotating shaft 21, and on the movable plate 38 are arranged in the same direction a rack 41 adapted to engage with the pinion 40 and a L-shaped adjustable cam 42 adapted to contact the stylus 35 of the hydraulic servo-valve 31. The angle of inclination of the cam 42 can be freely adjustable with its one end so fixed by a shaft 43 as to act as a fulcrum. By 44 is indicated a guide groove provided on the other end of the cam 42 and by 45 a fastener.

Next, in a hydraulic circuit 46 connecting the hydraulic cylinders 27 to the hydraulic servo-valve 31 is provided a hydraulic device 47. The working oil is supplied through the hydraulic servo-valve 31 and the hydraulic device 47 to both hydraulic cylinders 27 and actuates the rods 29 to cause the stripper plate 25 to move forward.

In the ejecting device having the above construction, since to the front end of the rotating shaft 21 is connected, the gear 18 adapted to rotate each core 12 and to the other end thereof the pinion 40 of the movement control means 36 through the medium of the electromagnetic clutch 39, the cores 12 and the movable plate 38 can be simultaneously operated by the revolution of the rotating shaft 21. When the movable plate 38 is actuated by the action of the pinion 40 and the rack 41 to move in one direction, the stylus 35 adapted to contact the cam 42 moves forward along a slope changing its position, thereby causing the stripper plate 25 to move forward in the mold releasing direction by means of the rods 29 integrally connected thereto. Accordingly, once the angle of inclination of the cam 42 has been adjusted so as to be equal to the pitch of screw thread of the cores 12, the stripper plate 25 will be able to move at a velocity corresponding to the lead of screw thread of the cores.

From the above description it will be seen how the mold releasing device of this invention is constructed. Further, its operation and action will be described hereinafter. The injection molding process is roughly divided into the following operations and proceeds in the following order: Mold clamping → injection → cooling → mold opening → revolution of cores and advance of stripper plate → ejecting of molded article → mold closing → mold clamping.

Figure 2:
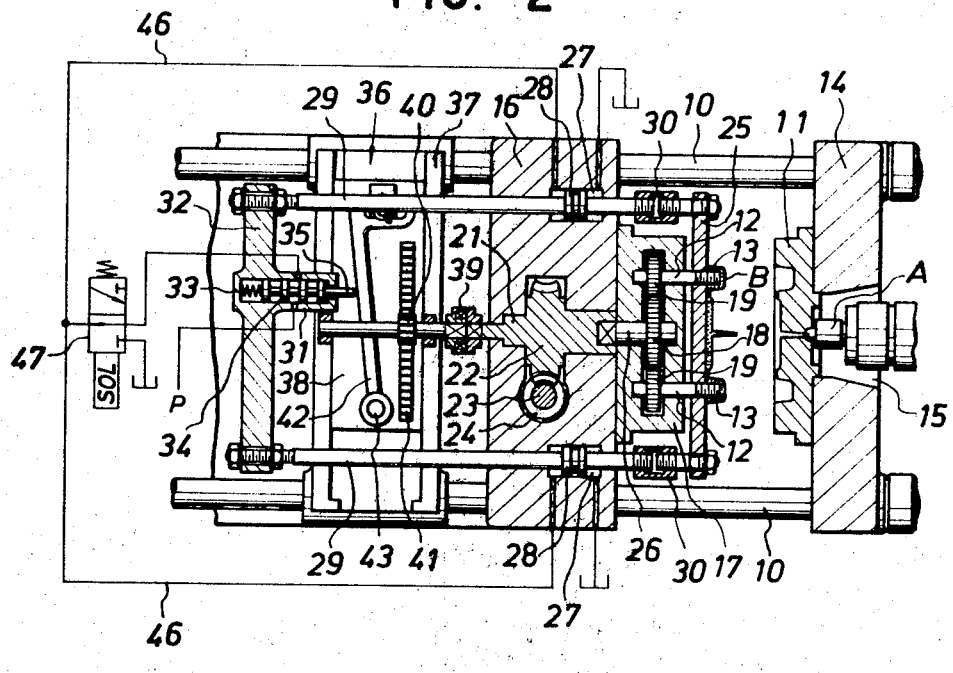
FIG. 2 shows a plan in cross-section of the device of this invention at the time of ejecting.

Referring to FIGS. 1, 2, 3 and 4, FIG. 1 shows the mold opening in which the mold is in a open state. At this time a switch is actuated so that the driving shaft 23 connected to the motor causes the rotating shaft 21 by the aid of the worm 24 and the worm gear 22 to rotate in the direction indicated by the arrow. The rotating shaft 21 rotates the cores 12 in a fixed direction through the medium of the electromagnetic clutch 39 and the gear group consisting of the gear and pinions. As a result of this an action to remove the molded article designated by B occurs in the positions of the cores 12 as shown in FIG. 2 and simultaneously the movable plate 38 in the control means 36 moves thereby causing the stripper plate 25 to move forward by a combined action of the cam 42, stylus 35 and rods 29. The movement of said stripper plate 25 results from the action of the working oil forced through the hydraulic servo-valve 31 to the hydraulic cylinders 27. Accordingly, since the quantity of oil supplied thereto is controlled by the hydraulic servo-valve 31 and the stylus 35 of this hydraulic servo-valve 31 contacts the cam 42 the angle of inclination of which has been adjusted to be equal to the pitch of screw thread of the cores 12, the stripper plate 25 moves at a velocity corresponding to the lead of screw thread of the cores thus permitting to reliably remove the molded article B from the mold.

Figure 3:
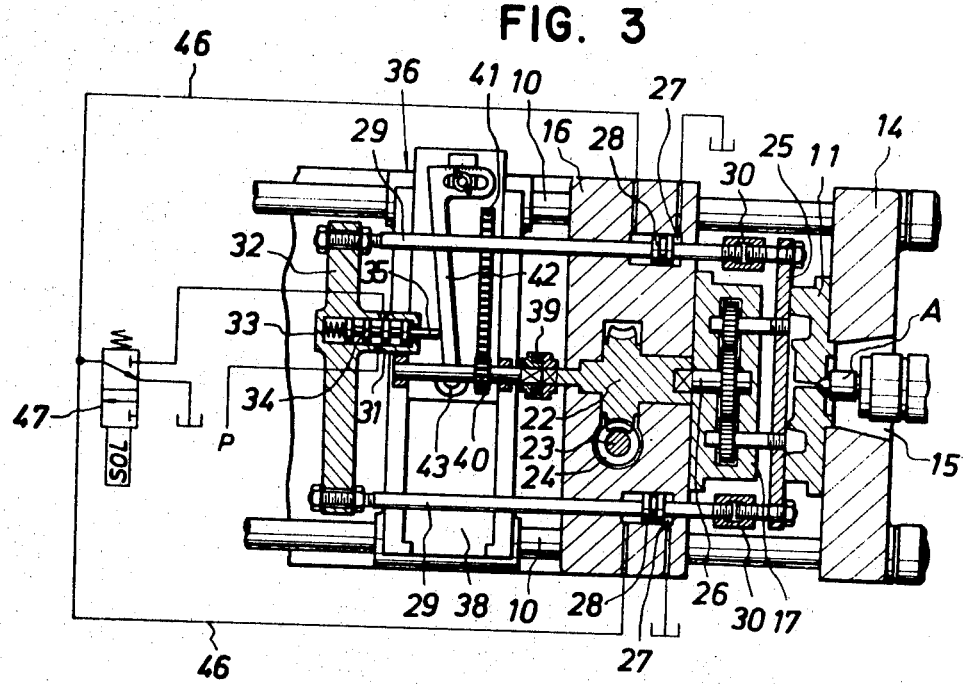
FIG. 3 shows a plan in cross-section of the device of this invention at the time of fast feed.
Figure 4:
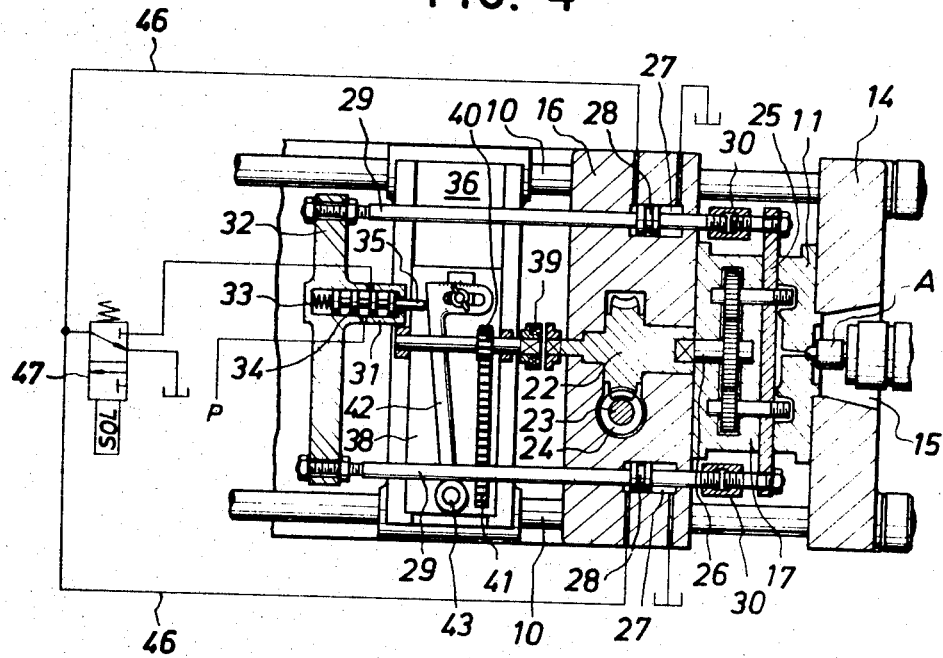
FIG. 4 shows a plan in cross-section of the device of this invention at the time of mold closing.
Figure 5:
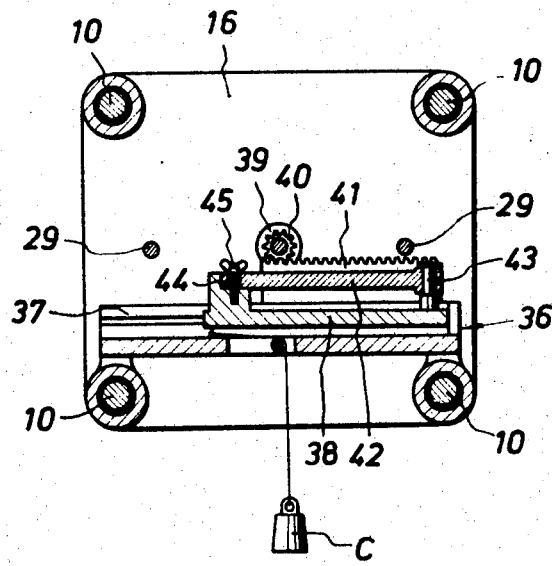
FIG. 5 is a vertical sectional view of the control means.

When the releasing of the molded article B is recognized, the mold closing operation is started as shown in FIG. 3 and the motor is stopped by actuating the switch. And the electromagnetic clutch 39 is released, the movable plate 38 is put in its free state and at the same time the hydraulic circuit is shut off in the hydraulic device 47. As a result of this the hydraulic resistance in each hydraulic cylinder 27 is relieved, and the movable plate 38 immediately after having been in its free state moves back to its original position, forcing in the stylus 35, under the action of the weight C hung on its back side. Further, when the moving mold clamping plate 16 is moved forward for the purpose of mold clamping, the stripper plate 25 remained in its advanced position is pushed back together with the rods 29 by the fixed mold 11 thereby urging the stylus 35 again toward its former projected position (refer to FIG. 4). After the mold closing and clamping has thus been completed, synthetic resin is injected into the mold cavity in the usual manner, and after the molding and cooling the mold opening is carried out in the state indicated in FIG. 1.

From the foregoing it will be apparent that the mold closing and opening mechanism according to the method of this invention is simplified as compared with those according to conventional methods by reason of the fact that the latter requires a control screw, while in this invention, as mentioned above, to a shaft rotating cores is connected a control means provided with a movable plate made integral with a cam in such a manner that said movable plate moves with the rotation of cores thereby causing a stripper plate to move forward at a velocity corresponding to the lead of screw thread of cores. Moreover, the moving speed of the stripper plate can be regulated by adjusting the cam even if the pitch of screw thread of cores is changed since the angle of inclination of the cam can be adjusted so as to be equal to the pitch of screw thread made on the circumference of cores. Furthermore, according to conventional methods the stripper plate projected to eject the molded article from the mold needs to be moved back to its original position because of the use of control screw while in this invention the mold closing can be realized leaving the stripper plate as it is since the stripper plate can be put in a free position. Accordingly, the molding operation according to the method of the present invention can be easily and rapidly accomplished compared with those of conventional methods, which constitutes many advantages of the method of this invention.

What is claimed is:

1. A device for ejecting in injection molding of threaded articles comprising a fixed mold provided on a fixed mold retaining plate and threaded cores installed on a moving mold clamping plate, said moving mold clamping plate having therein a rotating shaft, connected directly or through the medium of a gear to said cores, a plurality of rods movably supporting a stripper plate arranged around said cores and a cylinder urging said rods to move forward and backward, to the back end of said rotating shaft being connected, through the medium of a member converting rotary motion into rectilinear movement, a rectilinearly movable plate provided with a cam the angle of inclined of which can be adjusted to be equal to the pitch of screw thread of said cores and movable with said movable plate, and at the rear of said rods being provided a stylus in contact with said cam, and adapted to adjust forward movement of said rods and stripper plate to the lead of screw thread of said cores through activation of said cylinder upon movement of said cam with said plate upon rotation of said rotating shaft.

2. A device as set forth in claim 1 wherein the stylus at the rear of said rods supporting said stripper plate is made integral with a valve provided in a hydraulic servo-valve.

3. A device as set forth in claim 1 wherein a driving portion of said movable plate provided with said cam is connected through an electromagnetic clutch to said rotating shaft provided in said moving mold clamping plate.

4. A device as set forth in claim 1 wherein the cam on said movable plate has one end thereof fixed by a shaft on said movable plate so as to be set at an angle corresponding to the lead of screw thread of cores to be used in molding and the free end thereof shaped so as to be fixed at a desired angle and provided with a fastening member.

5. A device as set forth in claim 1 wherein a means for controlling movement of said stripper plate comprising such driving members as said movable plate, said cam, a pinion and a rack is provided with a weight hung in a suitable position to force said movable plate, when said control means is disconnected from said rotating shaft after a molding is released from the mold, to slide along a fixed frame into its original position.

* * * * *